(12) United States Patent
Hussain et al.

(10) Patent No.: US 9,429,458 B2
(45) Date of Patent: Aug. 30, 2016

(54) FLOWMETER HAVING ELECTRICAL SENSOR ELEMENTS CONNECTED IN SERIES AND APPLIED TO AN OUTER SURFACE OF A GUIDE STRUCTURE

(71) Applicant: Krohne AG, Basel (CH)

(72) Inventors: Yousif Hussain, Weston Favell (GB); Christopher Rolph, Hartwell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/022,366

(22) Filed: Sep. 10, 2013

(65) Prior Publication Data
US 2014/0069210 A1    Mar. 13, 2014

(30) Foreign Application Priority Data
Sep. 10, 2012   (DE) .................... 10 2012 017 797

(51) Int. Cl.
*G01F 1/84*    (2006.01)
*G01F 15/02*   (2006.01)

(52) U.S. Cl.
CPC ............ *G01F 1/849* (2013.01); *G01F 1/8427* (2013.01); *G01F 1/8436* (2013.01); *G01F 1/8472* (2013.01); *G01F 1/8477* (2013.01); *G01F 1/8495* (2013.01); *G01F 15/022* (2013.01)

(58) Field of Classification Search
CPC .... G01F 1/849; G01F 1/8413; G01F 1/8409; G01F 1/8427; G01F 1/8436; G01F 1/8472; G01F 1/8477; G01F 1/8495

USPC .................................. 73/861.356, 861.357
See application file for complete search history.

(56) References Cited

U.S. PATENT DOCUMENTS

| | | | |
|---|---|---|---|
| 5,381,697 A | 1/1995 | van der Pol | |
| 5,753,827 A | 5/1998 | Cage | |
| 5,827,979 A | 10/1998 | Schott et al. | |
| 6,684,715 B1 * | 2/2004 | Cage | 73/861.357 |
| 6,732,570 B2 * | 5/2004 | Francisco, Jr. | 73/32 A |
| 6,868,740 B2 | 3/2005 | Hussain | |
| 8,596,144 B2 * | 12/2013 | Rieder | 73/861.55 |
| 2003/0200816 A1 | 10/2003 | Francisco, Jr. | |
| 2011/0219872 A1 | 9/2011 | Hussain et al. | |
| 2012/0010846 A1 * | 1/2012 | Brian et al. | 702/151 |
| 2012/0073384 A1 | 3/2012 | Rieder | |

FOREIGN PATENT DOCUMENTS

| | | | | |
|---|---|---|---|---|
| GB | 2251947 A | * | 7/1992 | ......... B60C 23/0408 |
| JP | 09-079882 A | | 3/1997 | |
| WO | 00/42393 A1 | | 7/2000 | |
| WO | 01/18501 A1 | | 3/2001 | |
| WO | 2012/028425 A1 | | 3/2012 | |

* cited by examiner

*Primary Examiner* — Lisa Caputo
*Assistant Examiner* — Nathaniel T Woodward
(74) *Attorney, Agent, or Firm* — David S. Safran

(57) ABSTRACT

A flowmeter has a guide structure that can have medium flowing through it and which preferably operates using the Coriolis principle. To provide a flowmeter that allows a high as possible measuring accuracy with a space requirement that is as small as possible, at least one sensor element is applied on an outer surface of the guide structure for determining and/or monitoring at least one process variable.

2 Claims, 4 Drawing Sheets

FLOWMETER HAVING ELECTRICAL SENSOR ELEMENTS CONNECTED IN SERIES AND APPLIED TO AN OUTER SURFACE OF A GUIDE STRUCTURE

BACKGROUND OF THE INVENTION

1. Field of the Invention

The invention relates to a flowmeter, which preferably operates using the Coriolis principle, having a guide structure that can have medium flowing through it.

2. Description of Related Art

Coriolis mass flowmeters are used primarily in industrial process measuring technology in such applications that require high measurement accuracies. The operation of Coriolis mass flowmeters is based on at least one measuring tube with a medium flowing through it—as part of a corresponding guide structure, which is traversed by said medium—being excited to oscillation by an oscillation generator. Due to the two speeds orthogonal to one another—that of the flow and that of the measuring tube—caused by the Coriolis inertial force, the medium having mass reacts with the wall of the measuring tube, whereby the oscillation of the measuring tube undergoes a change in comparison with an oscillation of the measuring tube without the flowing medium. By detecting the characteristic oscillations of the measuring tube with flow—as, in particular, the phase difference, and thus, the time difference between the deflection of two measuring tube sections that oscillate in-phase when the measuring tube has no flow—the mass flow through the measuring tube can be determined with greater accuracy. Therefore, Coriolis mass flowmeters are often used in applications requiring calibration.

In order to comply with such high accuracy requirements, the state of the Coriolis mass flowmeter must be accurately determined and variables influencing the measurement results in the calculation of the mass flow rate need to be considered. This includes information-bearing signals, i.e., the excitation signals (currents and/or voltages) and the primary measurement signals of interest—i.e., the deflections of the measuring tube—and also other influencing variables, such as the temperature or mechanical stresses at significant points of the measuring tube. These variables are then included in the calculation of the measured value, wherein model calculations or calibration data are used.

A measuring arrangement with voltage, length change or temperature sensors for correction of the measured values are described, for example, in German Patent Application DE 102 56 376 A1 and corresponding U.S. Pat. No. 6,868,740 B2 or German Patent DE 42 24 379 C1 and corresponding U.S. Pat. No. 5,381,697. The measuring tube detects its own oscillation using strain sensors according to the teaching of the patent U.S. Pat. No. 6,684,715 B1.

Coriolis mass flowmeters are suitable not only for determining a mass flow rate, but they can also be used, for example, for determining fluid density and viscosity of the medium, just as they are also suitable for the detection of diagnostic parameters, such as the detection of a multiphase flow or the detection of deposits. In view of these variables, there is a strong interest in a precise as possible, and above all, consistently precise detection of the measured values.

Difficulties in the use of measuring instruments in process automation are often caused by cramped space, which make it necessary that the measuring instruments are as small as possible and designed in a compact manner.

SUMMARY OF THE INVENTION

A primary object of the present invention is thus to provide a flowmeter that allows a very high measuring accuracy with a reduced space requirement.

This object is met by the flowmeter of the present invention in that at least one sensor element for determining and/or monitoring at least one process variable is applied on an outer side of the guide structure. The process variable is, for example, the temperature of at least a part of the guide structure or connected with it by that of the medium. Another process variable is, for example, a change in length of the guide structure, or a mechanical stress. The process variable, which can be determined or monitored via the sensor element, is used, depending on the design, for the actual measurement, i.e., recording the oscillations of the guide structure or improving measuring accuracy. Depending on the design, either the primary measured value or a complementary measured value is determined and monitored. Due to application on the outside of the guide structure, in particular problems with sealing can be avoided or easier adaption of already-installed units can be made. Moreover, the flow of medium is not disturbed by protruding elements.

The medium to be measured is, in particular, in general, a flowable medium, such as a liquid, a gas or any combination, wherein solids can also be part of the medium.

The flowmeter is, in one configuration, in particular, a Coriolis mass flowmeter.

In one design, the sensor element is, in particular, a strain-measuring element. Such a sensor element allows, for example, the measurement of the deflection of a measuring tube or a measuring tube, or also stresses, which can occur in the guide structure (for example, due to the pressure in the medium, or the temperature effects due to the temperature of the medium, or oscillation generation, or external forces acting on the guide structure). The measuring accuracy is therefore increased, for example, in one design, in that, in addition to using, e.g., an electromagnetically operated oscillation sensor, the strain-measuring element absorbs the oscillations of the guide structure and both measurements are calculated together. Alternatively, the strain-measuring element is used for measuring and monitoring of tension in the guide structure. A strain-measuring element is therefore generally understood as a measuring element for measuring or monitoring a change in length or mechanical stress on the component, on which the strain-measuring element is mounted.

In a further design, the sensor element is a temperature sensor, which is used for measuring and/or monitoring a temperature of the guide structure or—possibly associated with it—the medium. Because the temperature also affects the oscillation behavior, a corresponding sensor is provided in this design to appropriately take the effects of the temperature into consideration using known dependences for the analysis and the determination of the flow.

In one embodiment, the assembly is simplified or protection of the sensor element is generated in that the at least one sensor element is arranged at least in part on a carrier element. During the manufacture, the at least one sensor element, for example, is placed on the carrier element and fixed and is then applied on the outside of the guide structure. Alternatively, the carrier element is attached to the outside of the guide structure provided with a sensor element.

In a variation, the guide structure has at least one tube-shaped measuring tube. For this purpose, the carrier element is designed and adapted to the measuring tube in such a manner that the carrier element can be placed around at least a portion of the measuring tube. The carrier element is thus, to a certain extent, elastic, so that it is preferably adapted to the cylindrical structure of the tube-shaped measuring tube.

Alternatively, the carrier element is made of a material that is deformable under certain conditions, and is otherwise particularly rigid.

Due to a carrier element, it can be taken into consideration that the space available for the flowmeter is limited or that production is to be simplified or accelerated. For manufacture, there is also the advantage of a pre-positioning of the sensor elements and possible further components, which are to be located on the outside of the guide structure.

In one design, only the sensor elements of a measuring tube are arranged on a carrier element and in an alternative design, the sensor elements that are assigned to more than one measuring tube are located on a carrier element. In the latter design, the carrier element covers quasi at least two measuring tubes as part of the guide structure.

In one design, the carrier element is provided with an adhesive layer or is an adhesive substance itself. In a further design, the carrier element consists at least partially of an adhesive strip. Alternatively or additionally, the at least one sensor element is provided with a cover or coating.

In one design, at least two sensor elements are provided. The sensor elements can be designed in different manners and be used for different measurement methods or configurations for the same process variable or for measuring and monitoring of different process variables. Alternatively, the sensor elements are all built in the same manner and allow, for example, redundant measurements. In the event that the measurement of the process variable has a local dependence, for example, sensor elements designed in the same manner are positioned at different locations or are directed in different directions for each measurement.

In one design, the at least two sensor elements are located diametrically facing one another on the guide structure or specifically on a substantially tubular or cylindrical measuring unit.

In one design, at least two sensor elements are also provided and are each designed as a strain-measuring element. The two strain-measuring elements are arranged substantially at the same orientation relative to the longitudinal axis of the guide structure. The sensor elements are thus used for determining or monitoring a change in length of the guide structure in the same direction but at different locations. Both sensor elements are oriented, in one design, in the direction of the longitudinal axis and, in an alternative design, run perpendicular to the longitudinal axis, however substantially parallel to one another. In other designs, the strain-measuring elements are arranged in an arbitrary intermediate position relative to the longitudinal axis. The sensor elements are thus differently positioned either axially along a longitudinal axis of the guide structure or radially or circumferentially around the guide structure or oriented in relation to their direction of measurement (such as the stretch along which a length change is determined). In addition, the sensor elements are located axially and radially or circumferentially at different positions.

In an alternative design, the at least two sensor elements, which are designed as strain-measuring elements, are arranged with different orientations relative to the longitudinal axis of the guide structure. Here, in particular, one strain-measuring element is arranged substantially along the longitudinal axis of the guide structure, whereas the other strain-measuring element is arranged substantially perpendicular to the longitudinal axis. Thus, the one measuring element allows the measurement of the axial strain or axial length change and the other measuring element allows the measurement of the circumferential strain or change in circumference.

Many sensor elements are, in particular, dependent on an electric contact in order to be supplied with electrical energy or in order to determine the parameter(s) of the sensor element used for measuring and monitoring the process variable(s). Thus, for example, the electrical resistance of specific elements change under the impact of temperature or, respectively, of strain or stretching of the element, so that the temperature and length changes can be inferred from the determination of the electric resistance using corresponding calibration curves. The lines or contacts are, for example, wires, etc.

In one embodiment it is provided that the at least two sensor elements are individually electrically contacted. Thus, in many variations, this leads to each sensor element having two electrical lines.

In order to reduce the number of electric lines and also the costs or space requirements, it is provided in one design that two sensor elements are connected electrically in series. In one design, more than two sensor elements are provided, so that at least two sensor elements, for example, at least three sensor elements, are electrically connected in series. At least one electrical line can be omitted due to this series circuit.

If, for example, the voltage drop is to be measured via the individual sensor elements, a tap between the sensor elements is still necessary. In one design, the electrical current is preferably measured using all the sensor elements.

The sensor elements mutually connected in series can be designed to be different or same. In one design, the sensor elements are of different types, so that in a particular design, one of the two sensor elements is designed as a strain-measuring element and the other of the two sensor elements is designed as a temperature-measuring element.

In one variation, the dependence of the electrical resistance is used in both—distinctly different—sensor elements, for determining and/or monitoring each process variable (strain or temperature). These sensor elements can be separately electrically contacted.

In one design, the strain-measuring element and the temperature-measuring element are electrically connected in series. Therefore, in one design, the electrical current is measured by both sensor elements via the two electrical contacts each only associated with one sensor element and the electric voltage is individually measured in conjunction with a center tap via each sensor element, i.e., via one contact quasi belonging to both sensor elements. In this design of the series circuit, at least one contact element, for example a wire, can be omitted, which also accommodates the limited space.

In one design, the guide structure for the medium has at least one measuring tube, which can have medium flowing through it.

In an enhanced configuration, the guide structure has at least two measuring tubes that are traversed by the measuring medium and preferably are excited to oscillation for measuring the flow.

In one design, the number of sensor elements corresponds at least to the number of measuring tubes and, in one design, is larger than the number of measuring tubes.

In an additional design, however, the number of the sensor elements is less than the number of the measuring tubes, so that each measuring tube is not provided with a sensor element. The latter design is characterized, in particular, by reduced costs and smaller space requirements.

In one design, at least two sensor elements are provided and the guide structure has at least two measuring tubes. Here, at least one sensor element is respectively arranged on an outside of a measuring tube. Further, the sensor elements are arranged on the respective measuring tubes in such a manner that the relative positions of the sensor elements are different circumferentially around the respective measuring tube. Thus, for example, one sensor element is arranged above a measuring tube, and the other sensor element is arranged below the other measuring tube. The sensor elements can further be arranged at different heights along the longitudinal axis of the guide structure. In an alternative design, the sensor elements are located at the same axial height opposite each other. In an additional, alternative design, each sensor element is arranged on a measuring tube, wherein the relative positions of the sensor elements on the measuring tubes are essentially the same.

The difference in position circumferentially around the lines means that the sensor elements, in one design, are arranged in a different range of angles in a level perpendicular to a longitudinal axis of the guide structure. In an alternative design, the sensor elements are located, in each case, in the same range of angles. In this case, levels that are used for viewing and comparing the range of angles, coincide with each other or are arranged parallel, behind one another, which reflects that, in one design, the sensor elements are arranged at different heights along the longitudinal axis of the guide structure.

Generally, it can be said, that in the event that the guide structure includes several measurement lines and the flowmeter has several sensor elements, the sensor elements are circumferentially disposed at different positions on the measuring tubes. Alternatively or additionally, the sensor elements are located on the measuring tubes axially at different heights relative to a longitudinal axis of the guide structure.

In one design, the two sensor elements are arranged on a measuring tube in such a manner that the two sensor elements are circumferentially opposite one another. The two sensor elements are circumferentially offset to one another by 180° in this design so that, in one variation, a sensor element is arranged on top of its measuring tube and the other sensor element is arranged on the bottom of its measuring tube. Thus, if both sensor elements were located on a common measuring tube, they would be diametrically opposite one another. In distributing over several measuring tubes, the available space can be used more effectively and a more accurate measurement can be made due to the impact of processes conditions or the medium on different points of the guide structure. For example, in one design, the circumferential measuring situation of a quasi commonly-formed measuring tube is calculated using the measurement data of the sensor elements for the individual measuring tubes.

In one design, the number of measuring tubes of the guide structure is increased to at least four. In one design, the four leads are arranged one above the other in two rows of two and thus arranged in two columns of two side by side. In particular, a rectangle or even a square is formed by the four measurement lines depending on the chosen distance between the measuring tubes.

In one design, only two sensor elements are provided for the four measuring tubes according to the preceding design, each of which being associated with one measuring tube. Here, the relative positions of the sensor elements circumferentially around the respective measuring tube are varied in each case. In particular, in one design, one sensor element is located above a measuring tube and the other sensor element is located below the other measuring tube. The lines, which are equipped with the sensor elements, are located in different rows and in different columns of the four measuring tubes. Circumferentially, the sensor elements are offset to one another by 180° as in one of the preceding designs.

In a further design, four sensor elements are provided for the four measurement lines which are offset circumferentially relative to one another by 90°. For a number of sensor elements n, these are therefore generally preferably offset relative to one another by 360°/n circumferentially, n being a natural number greater than one.

This type of distribution of several sensor elements can also be carried out in a measuring tube so that, in one design, three sensor elements are offset to one another by 120° around a measuring tube.

In detail, there are a variety of possibilities for designing and further developing the flowmeter according to the invention. Here, reference is to the following description of exemplary embodiments in conjunction with the accompanying drawings.

DETAILED DESCRIPTION OF THE INVENTION

Figure 1:
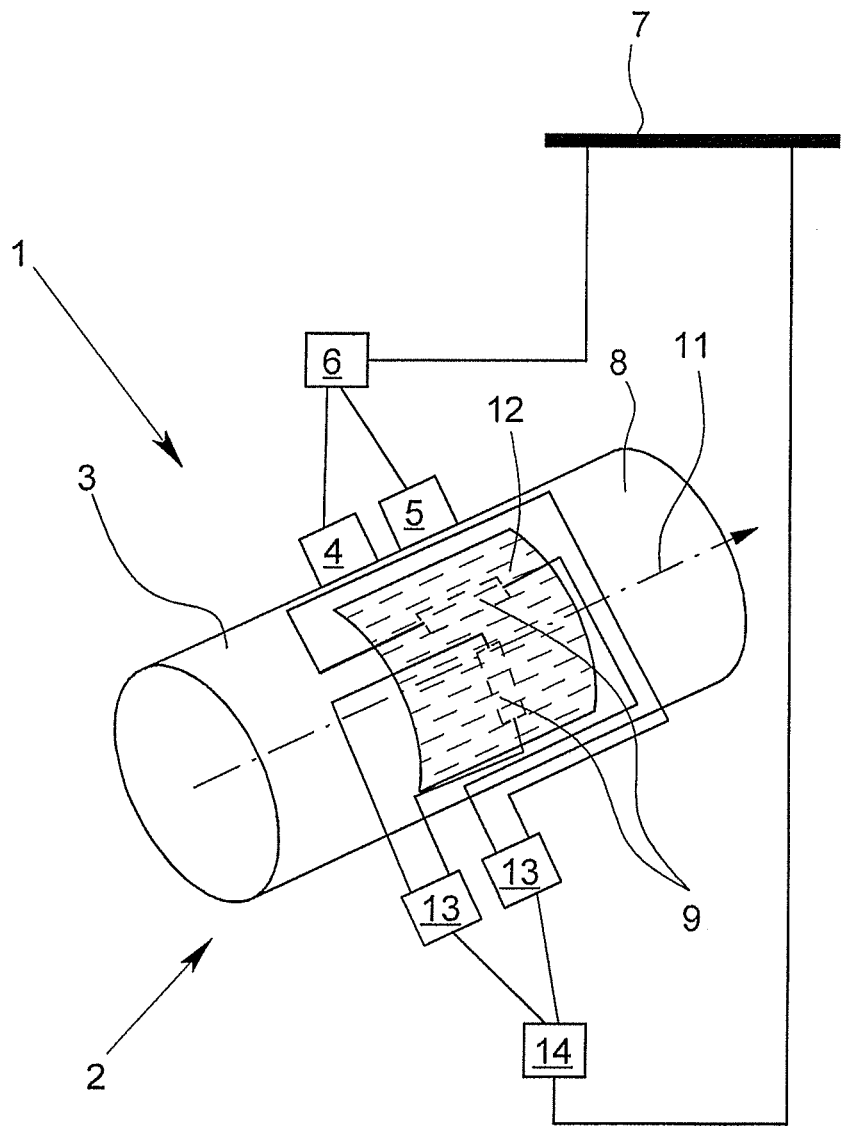
FIG. 1 is a schematic spatial representation of a flowmeter according to the invention.
Figure 2:
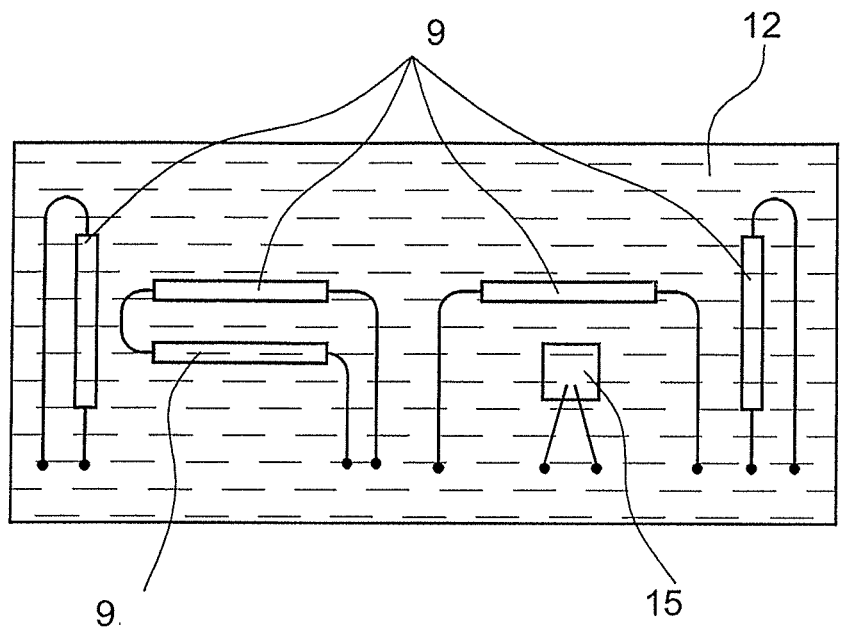
FIG. 2 is a schematic top view of a part of an alternative embodiment of a flowmeter according to the invention.
Figure 3:
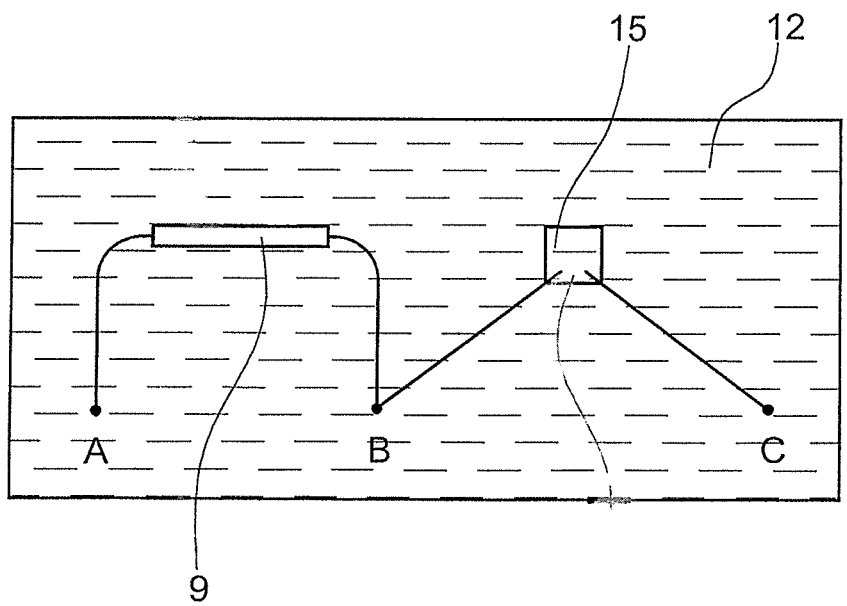
FIG. 3 shows an alternative to the embodiment illustrated in FIG. 2
Figure 4:
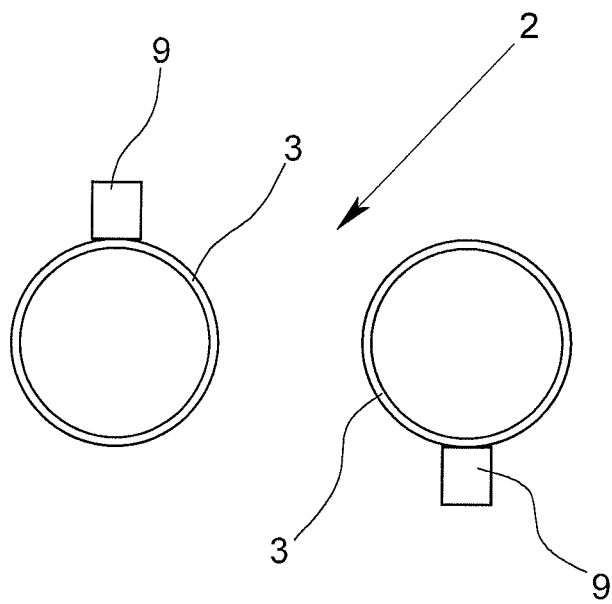
FIG. 4 is a sectional view of an exemplary schematic embodiment of a flowmeter according to the invention.
Figure 5:
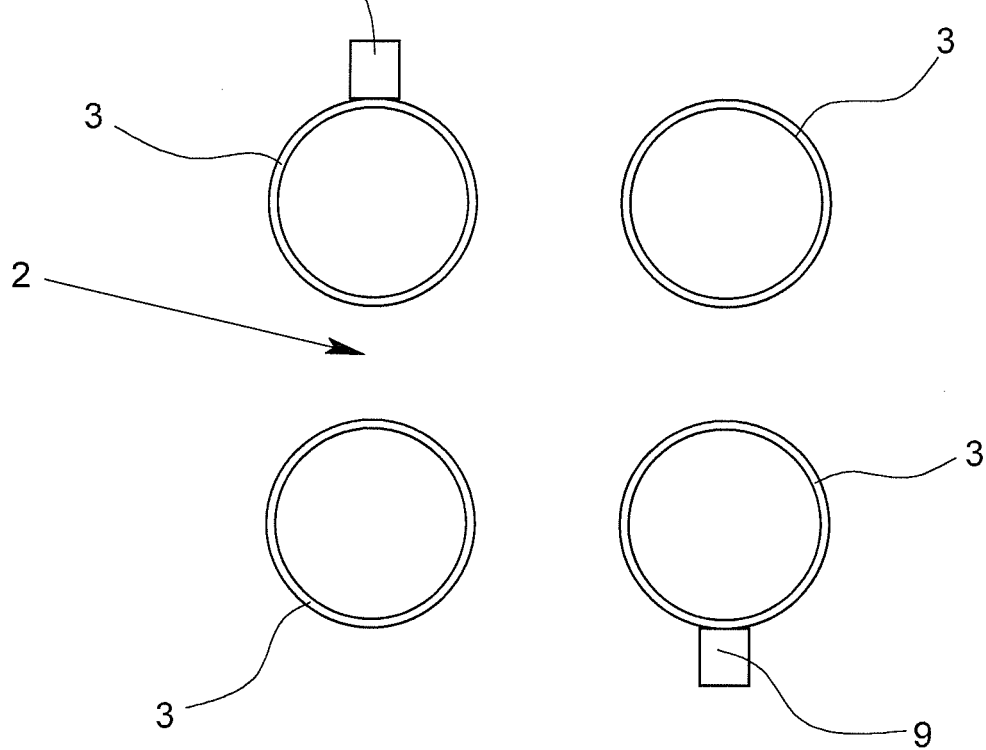
FIG. 5 is a sectional view of a further example of a flowmeter according to the invention.
Figure 6:
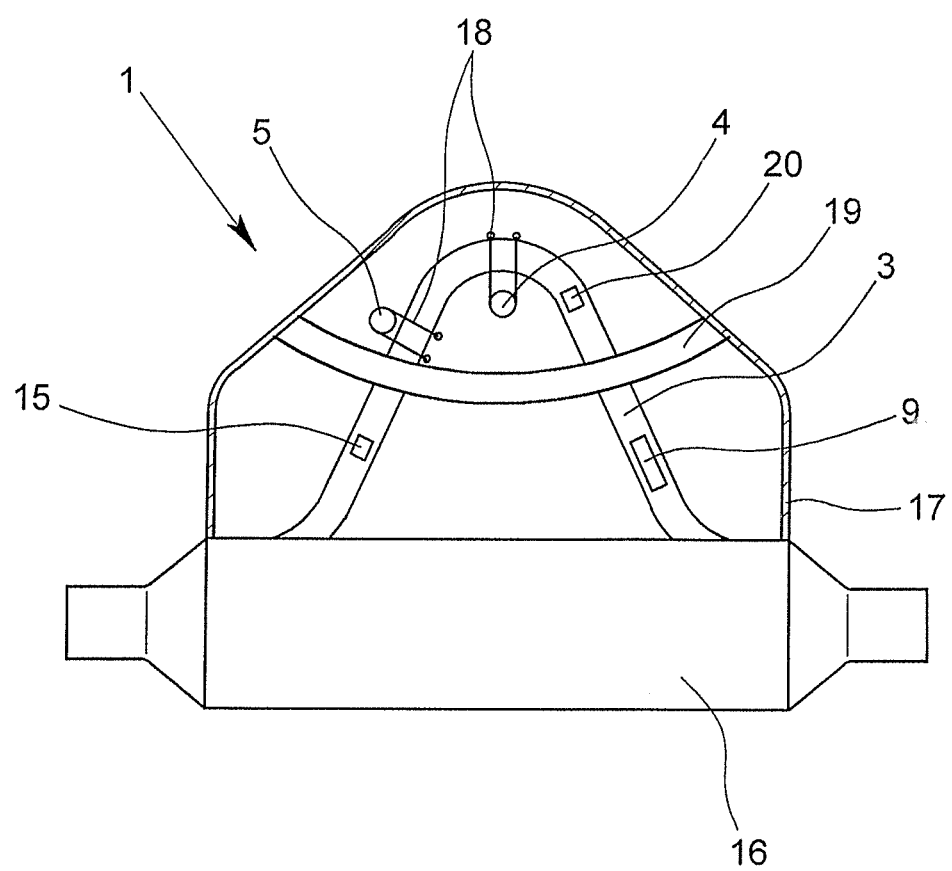
FIG. 6 is a sectional view of a further embodiment of the flowmeter according to the invention.

A perspective view of a first embodiment of a flowmeter 1 according to the invention is shown in FIG. 1. FIGS. 2 and 3 each show sensor elements 9 on a carrier element 12. In FIGS. 4 and 5, variations of the arrangement of the sensor element 9 are shown, each for a different design of the guide structures 2. FIG. 6 shows a sectional view of an additional variation of a flowmeter 1.

FIG. 1 schematically shows a flowmeter 1, guide structure 2 comprised of a measuring tube or tube 3. This measuring tube 3 is traversed by a medium not shown), its mass flow being determined by the flowmeter 1 operating according to the Coriolis principle.

For this, an oscillation generator 4 is provided on the measuring tube 3, which excites the measuring tube 3 into mechanical oscillations. The oscillation generator 4 works, in particular, electromagnetically. The flowing measuring medium inversely affects the oscillations, so that the mass flow can be determined from the effective oscillations of the measuring tube 3. For this, an oscillation generator 5 is provided on the measuring tube 3, which taps the effective oscillations.

Based on the excited oscillation and the detected oscillation, a value for the mass flow is determined here in a Coriolis evaluation unit 6 and, in the shown variation is delivered by a field bus 7, for example, to a control room— not shown here.

In order to increase the measurement accuracy, at least one, and in the illustrated example two sensor elements 9 are arranged on the outer surface 8 of the measuring tube 3. The sensor elements 9, here, each comprise strain-measuring sensor elements 9 —in the variation shown, designed as strain-measuring strips for measuring mechanical strains in the measuring tube 3.

Here, a sensor element 9 is arranged along the longitudinal axis 11 of the measuring tube 3 and the other sensor element 9 is arranged perpendicular thereto. They thus allow measuring and monitoring of the measuring tube 3 in different directions. A carrier element 12 is provided above the sensor elements 9, which is used here, in particular, for the protection of the sensor elements 9 against its surroundings.

Each of the sensor elements 9 is individually electrically connected and each is respectively connected to their own preprocessing unit 13 which, here, especially, are used for measuring or determining the respective electrical resistance of the sensor elements 9.

A strain-evaluating unit 14 is connected to the preprocessing unit 13, which determines a strain on the measuring tube 3 from the data of the preprocessing unit 13 and delivers this value in turn to the control room—not shown here—via the field bus 7. There, if applicable, the value of the mass flow is accordingly corrected.

The structure of the measuring device 1 is characterized by a relatively small space requirement, wherein an increase in measurement accuracy or a guarantee of a consistently high accuracy is obtained by the additional measurement of the mechanical strain in the measuring tube 3 or its change in length.

Several sensor elements 9 are applied on a carrier element 12 in FIG. 2. In this variation, the sensor elements 9 are first applied on the carrier element 12, where they are fixed, e.g., with an adhesive substance. In the manufacture, the assembled carrier element 12 is then placed around the outside of part of the corresponding guide structure.

Both outer strain-measuring sensor elements 9 are arranged in such a manner and the carrier element 12 is designed to be so large, that these two outer sensor elements 9 lie diametrically opposite one another on a tube-shaped measuring tube after application on the carrier element 12. For this purpose, both sensor elements 9 are configured substantially the same and have the same orientation.

Several other strain-measuring sensor elements 9 are located in between them, e.g., oriented perpendicular to the outer strain-measuring sensor elements 9, wherein two are electrically connected in series. Additionally, a temperature-measuring element 15 is provided, which allows a measurement of the temperature of the measuring tube or, also the measuring medium.

An embodiment is shown in FIG. 3, in which two different sensor elements 9 are electrically connected in series. These sensor elements 9 are likewise located on a carrier element 12.

A strain-measuring sensor element 9 and a temperature-measuring element 15 are also present. In the embodiment shown, these are passive elements, the electrical resistance of each depending on a process variable: strain or temperature.

In order to determine the electric resistance, an electric current is impressed between points A and C, and the voltage drop between points A and B or B and C is measured. The electrical resistance is then obtained using the Ohm's law.

This configuration with the series-connected sensor elements 9 is particularly wherein there is no need for another cable, as would be required with a separate electrical contact. In this manner, costs can be reduced and it is possible to respond to the limited space, as less space is needed.

Depending on the design of the sensor elements, however, a voltage between A and C can also be measured, so that the intermediate section at point B can be completely omitted, and only a direct connection between the two sensor elements 9 is to be provided.

In the designs illustrated in FIGS. 4 and 5, each guide structure 2 has more than one measuring tube 3 for the medium—not shown—: namely, two in the embodiment in FIG. 4 and four in the embodiment in FIG. 5.

In the embodiment in FIG. 4, each sensor element 9 is assigned to a measuring tube 3. The relative positions of the sensor elements 9 to each assigned measuring tube 3, which refer here to the circumference of the measuring tube 3, are different. Both sensor elements 9 are found, in each case, at different spatial angles with respect to a level perpendicular to the longitudinal axis of the guide structure 2, which is perpendicular, here, to the drawing plane and also runs parallel to the longitudinal axes of the measuring tubes 3 in the illustrated embodiment.

In respect to the circumference, the two sensor elements 9 lie directly opposite one another, so that one sensor element 9 is arranged above and the other below. Axially, the sensor elements 9 are applied, in the illustrated embodiment, at the same height. In an alternative embodiment—not shown here—, the sensor elements 9 are located axially along the longitudinal axis of the guide structure 2 at different heights.

This opposing arrangement of sensor elements 9 can also be found in the embodiment in FIG. 5, in which the guide structure 2 has four measuring tubes 3.

The measuring tubes 3 are arranged in the shape of a square in two rows of two or two columns of two. Here, not all of the measuring tubes 3 are provided with a sensor element 9, rather there are only two sensor elements 9 for the four measuring tubes 3, so that a cost reduction occurs and the space requirement is reduced.

The two sensor elements 9 are located circumferentially relative to the associated measuring tubes 3 at different positions. Furthermore, the sensor elements 9 are assigned to the measuring tubes 3, which are located in different rows and different columns.

The measuring tube 3 of the design in FIG. 1 is designed as a straight tube, whereas there are also bent tubes of V-, U- or Ω-shape in some flowmeters in the prior art. In addition to the curved or bent tubes, an enclosing housing is usually provided.

Such a curved measuring tube 3 is shown in FIG. 6 with a flowmeter 1, which, in particular, has two measuring tubes 3 arranged parallel to each other—and therefore, shown in a simplified manner.

The curvature of the tubes takes place using a straight carrier element 16, which can be used in a common pipe system. The measuring tubes 3, of which only one can be seen here, are surrounded by a housing 17.

The oscillation generator 4 is located within the arc of the measuring tube 3 and the vibration sensor 5 outside thereof. Both are each respectively connected by a bracket 18 to the measuring tubes 3, whereby forces and moments are also transferred. The brackets 18 encompass the measuring tubes 3 at least at an angle of 90°. The brackets 18 are furthermore designed such that the oscillation generator 4 or the oscillation sensor 5 has a predetermined distance from the wall of the measuring tubes 3.

Additionally, a temperature control line 19 extends through the housing 17, which provides a constant temperature by either heating or cooling and simultaneously is used as a reinforcing element in the interior of housing 17.

A strain-measuring sensor element 9 for measuring or monitoring the strain on the measuring tube 3 and a temperature-measuring element 15 are provided as sensor elements 9 on the measuring tube 3. In addition to the temperature-measuring element 15 and the interaction between the measured medium and the temperature control line 19, an energy harvester 20 is operated, which obtains energy by exploiting a temperature difference, here.

Since the measuring tube 3 is curved, the orientation or positioning of the sensor elements 9 is based, in each case, on a common pipe section or, respectively, on the unbent measuring tube 3, and thus, the straight longitudinal axis. In one embodiment, reference is made to the path of the measuring medium within the measuring tube 3 as the longitudinal axis and for referencing.

What is claimed is:

1. Flowmeter, comprising:
   a guide structure through which a medium is flowable, and
   at least two electrical sensor elements applied to an outer surface of said guide structure,
   one of said at least two sensor elements being a strain-measuring element and another of said at least two sensor elements being a temperature-measuring element, and
   said strain-measuring element and said temperature-measuring element being electrically connected in series, and
   wherein measurements obtained by the strain-measuring element and said temperature-measuring element are obtained directly at a point in the series connection between them;
   wherein said guide structure has at least two measuring tubes,
   wherein each sensor element of said at least two sensor elements is arranged on an outer surface of one of said at least two measuring tubes, and
   wherein relative circumferential position of said at least two sensor elements around the respective measuring tube are different, and
   wherein said at least two sensor elements are arranged on a carrier element.

2. Flowmeter according to claim 1, wherein said guide structure has at least four measuring tubes which are superimposed in two rows and mounted flush on one another in two columns, wherein each sensor element of said at least two sensor elements is associated with a respective measuring tube, wherein the relative positions of the sensor elements differ circumferentially around the respective measuring tube, and wherein the measuring tubes with which said at least two sensor elements are associated are located in different rows and columns of said four measurement tubes.

* * * * *